US012434401B2

(12) United States Patent
Su

(10) Patent No.: US 12,434,401 B2
(45) Date of Patent: Oct. 7, 2025

(54) CUTTER ADAPTED FOR USE WITH A POWER TOOL

(71) Applicant: Hong Ann Tool Industries Co., Ltd., Taichung (TW)

(72) Inventor: Cheng-Wei Su, Taichung (TW)

(73) Assignee: HONG ANN TOOL INDUSTRIES CO., LTD., Taichung (TW)

( * ) Notice: Subject to any disclaimer, the term of this patent is extended or adjusted under 35 U.S.C. 154(b) by 436 days.

(21) Appl. No.: 17/973,708

(22) Filed: Oct. 26, 2022

(65) Prior Publication Data

US 2023/0211517 A1 Jul. 6, 2023

(30) Foreign Application Priority Data

Dec. 30, 2021 (TW) ................................ 110149699

(51) Int. Cl.
*B26D 5/08* (2006.01)
*B26D 1/00* (2006.01)
(Continued)

(52) U.S. Cl.
CPC ............ *B26D 5/08* (2013.01); *B26D 1/0006* (2013.01); *B26D 3/169* (2013.01); *B26D 7/02* (2013.01);
(Continued)

(58) Field of Classification Search
CPC .......... B26D 5/08; B26D 1/0006; B26D 3/16; B26D 3/169; B26D 7/02;
(Continued)

(56) References Cited

U.S. PATENT DOCUMENTS 2,903,064 A * 9/1959 Blonder ............... H02G 1/1229 30/233
3,608,194 A * 9/1971 Miller .................... B23D 21/08 30/93
(Continued)

FOREIGN PATENT DOCUMENTS

CN 215202201 U 12/2021
KR 100973117 * 12/2009
(Continued)

OTHER PUBLICATIONS

Igus, Engineer's Toolbox, Gear trains (URL: https://toolbox.igus.com/9567/gear-trains-an-in-depth-look) site last accessed Feb. 27, 2025 (Year: 2024).*

*Primary Examiner* — Adam J Eiseman
*Assistant Examiner* — Fred C Hammers
(74) *Attorney, Agent, or Firm* — Muncy, Geissler, Olds & Lowe, P.C.

(57) ABSTRACT

A cutter includes a main body, a cog assembly, and a blade. The main body is provided with an anvil. The cog assembly includes a drive shaft and a first and a second cog. The drive shaft is rotatably connected to the main body. The drive shaft has a first end configured to detachably connect which a power tool. The first cog moves synchronously with the drive shaft. The second cog is rotatably connected to the main body and rotates upon rotation of the first cog. The blade is rotatably connected to the main body and connected to the second cog. The blade is rotatable between a deployment position and a cutting position and has a cutting edge. The cutting edge is disposed away from the anvil when the blade is in the deployment position, but is adjacent to the anvil when the blade is in the cutting position.

14 Claims, 11 Drawing Sheets

(51) Int. Cl.
*B26D 3/16* (2006.01)
*B26D 7/01* (2006.01)
*B26D 7/02* (2006.01)

(52) U.S. Cl.
CPC ................ *B26D 2001/0066* (2013.01); *B26D 2007/013* (2013.01)

(58) Field of Classification Search
CPC ...... B26D 2001/0066; B26D 2007/013; B23D 21/06; B23D 21/10
USPC .................................... 83/452; 30/92, 93, 94
See application file for complete search history.

(56) References Cited

U.S. PATENT DOCUMENTS

| | | | | |
|---|---|---|---|---|
| 8,261,453 | B2 | 9/2012 | Huang | |
| 2010/0018059 | A1 | 1/2010 | Huang | |
| 2020/0016670 | A1* | 1/2020 | Wang | B25B 7/12 |

FOREIGN PATENT DOCUMENTS

| | | |
|---|---|---|
| TW | M593935 U | 4/2020 |
| TW | M612717 U | 6/2021 |

* cited by examiner

CUTTER ADAPTED FOR USE WITH A POWER TOOL

BACKGROUND OF THE INVENTION

1. Field of the Invention

The present invention relates to a cutter and, particularly, to a cutter adapted for use with a power tool.

2. Description of the Related Art

TW Patent No. M593935 discloses a cutter adapted for cutting various pipes. The cutter includes a handle, a blade, a restoring member, a stopping member, a first elastic member and a pressing handle. The blade is pivotally connected to the handle and has a cutting edge and a plurality of serrations. First and second ends of the restoring member are respectively fixed to the blade and the handle. The stopping member is pivotally connected to the handle and is restrained while engaged with one of the plurality of serrations. First and second ends of the first elastic member are respectively fixed to the stopping member and the handle. The pressing handle is pivotally connected to the handle and operably rotatable in a direction to drive a pressing structure. When the pressing handle is operably rotated, the pressing structure is driven to push the blade, and additionally, the stopping member can displace at least two or more of the plurality of serrations in one displacement. Consequently, the operational process of the cutter is laborious.

The present invention is, therefore, intended to obviate or at least alleviate the problems encountered in the prior art.

SUMMARY OF THE INVENTION

According to the present invention, a cutter adapted for use with a power tool includes a housing assembly, a cog, and a blade. The housing assembly includes an anvil. The cog assembly includes a drive shaft and a first and a second cog. The drive shaft is rotatably connected to the housing assembly. The drive shaft has a first end configured to detachably connect with the power tool. The first cog is disposed on the drive shaft and moves synchronously with the drive shaft. The second cog is rotatably connected to the housing assembly and rotates upon rotation of the first cog. The blade is connected to the cog assembly. The blade is rotatably connected to the housing assembly and connected to the second cog in a manner that rotates synchronously with the second cog. The blade has a cutting edge selectively cutting an object to be cut by the cutter. The blade is rotatable between a deployment position and a cutting position with respect to the object. The cutting edge is disposed away from the anvil when the blade is in the deployment position, but is adjacent to the anvil when the blade is in the cutting position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
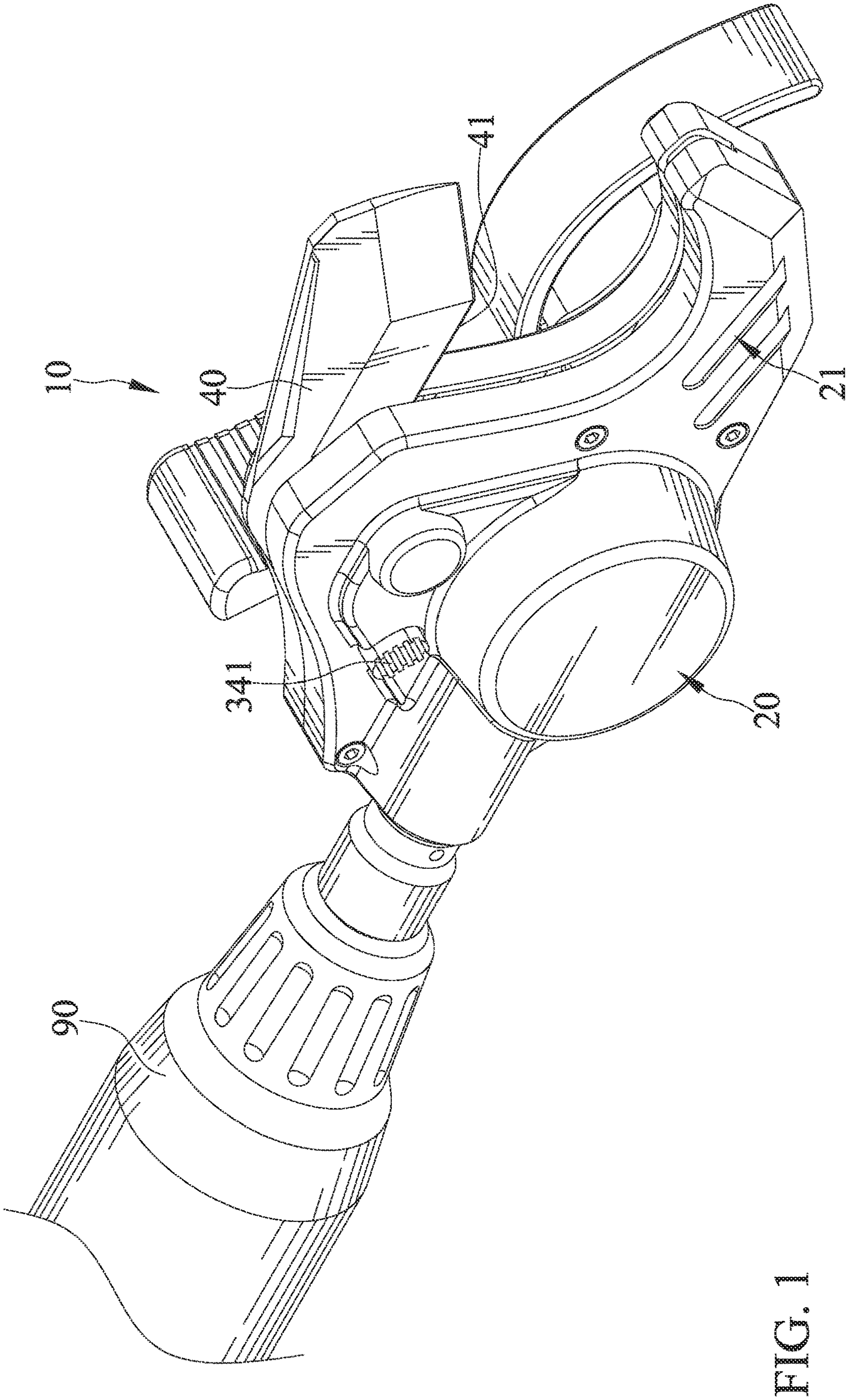
FIG. 1 is a perspective view of a cutter adapted for use with a power tool in accordance with the present invention.
Figure 2:
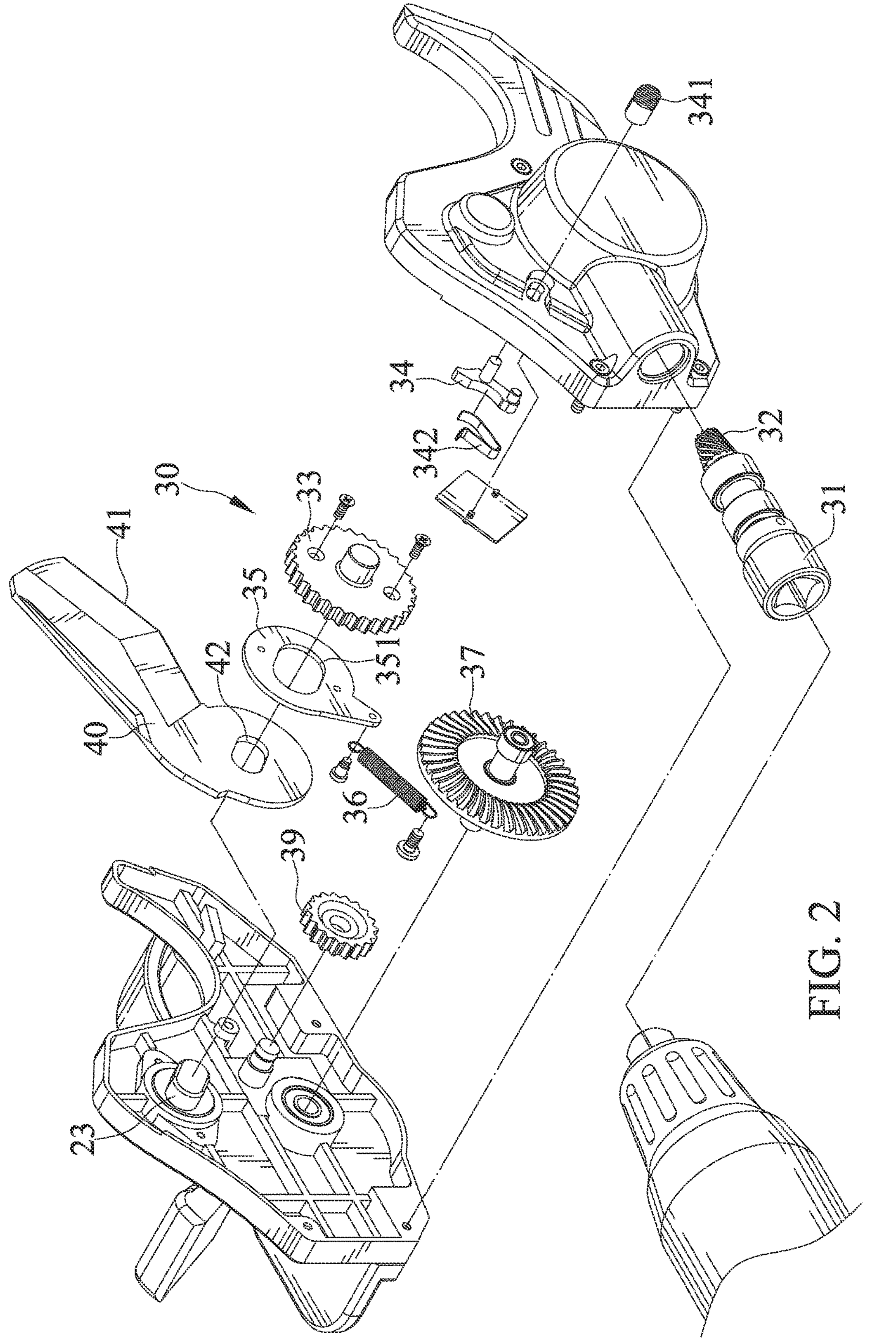
FIG. 2 is an exploded perspective view of the cutter of FIG. 1.
Figure 3:
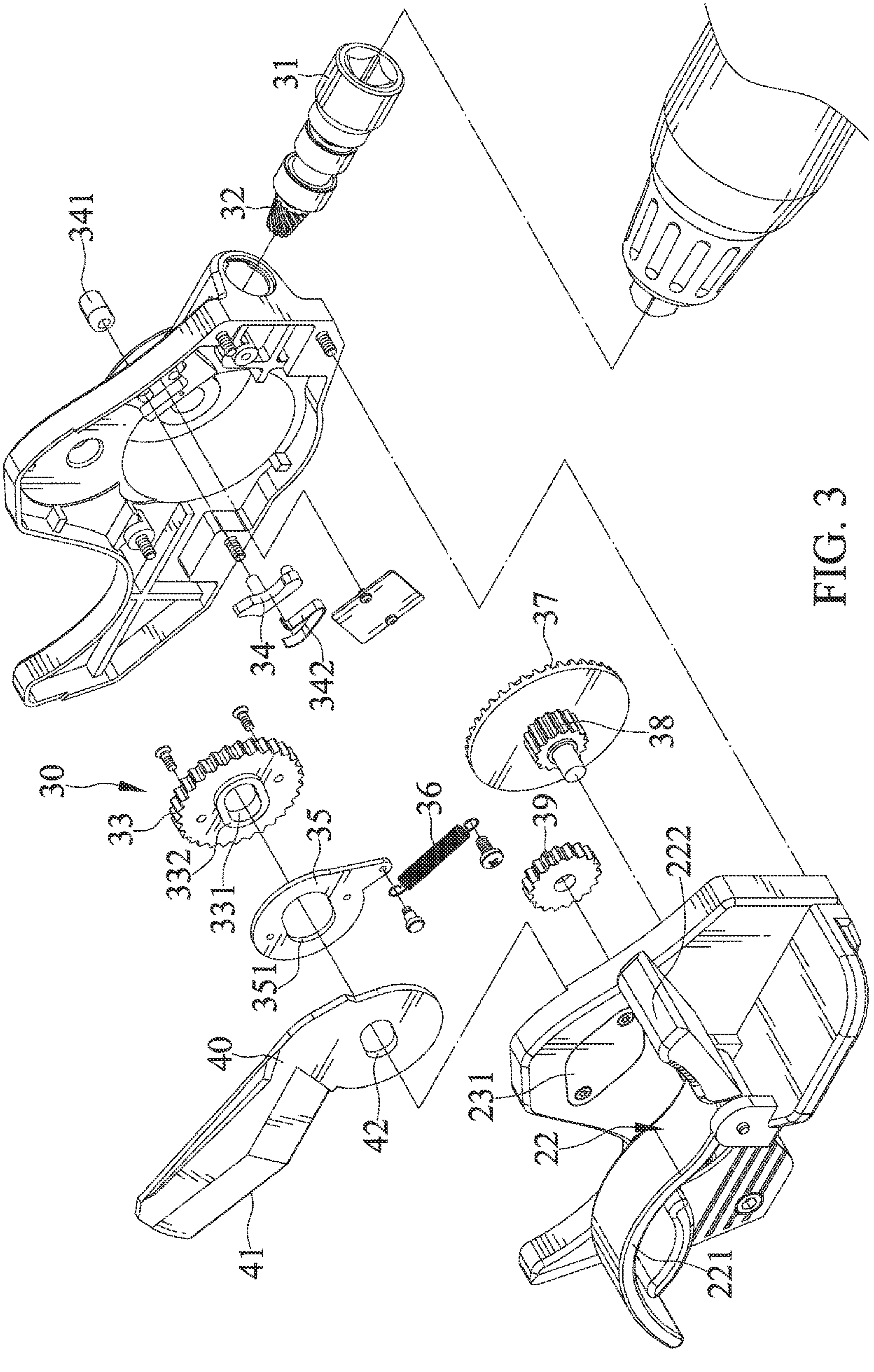
FIG. 3 is another exploded perspective view of the cutter of FIG. 1.
Figure 4:
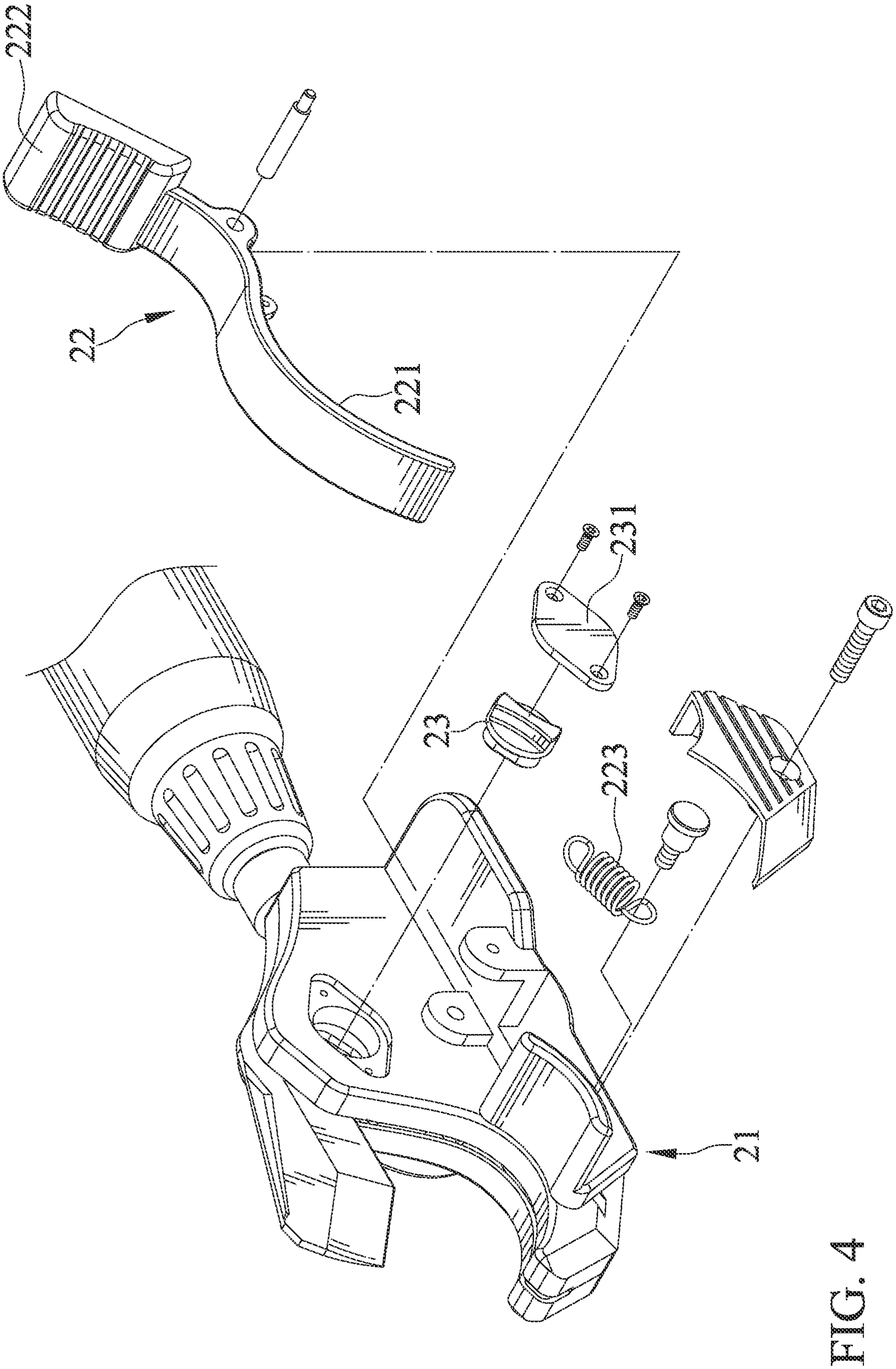
FIG. 4 is an exploded perspective view of a clamping device of the cutter of FIG. 1.
Figure 5:
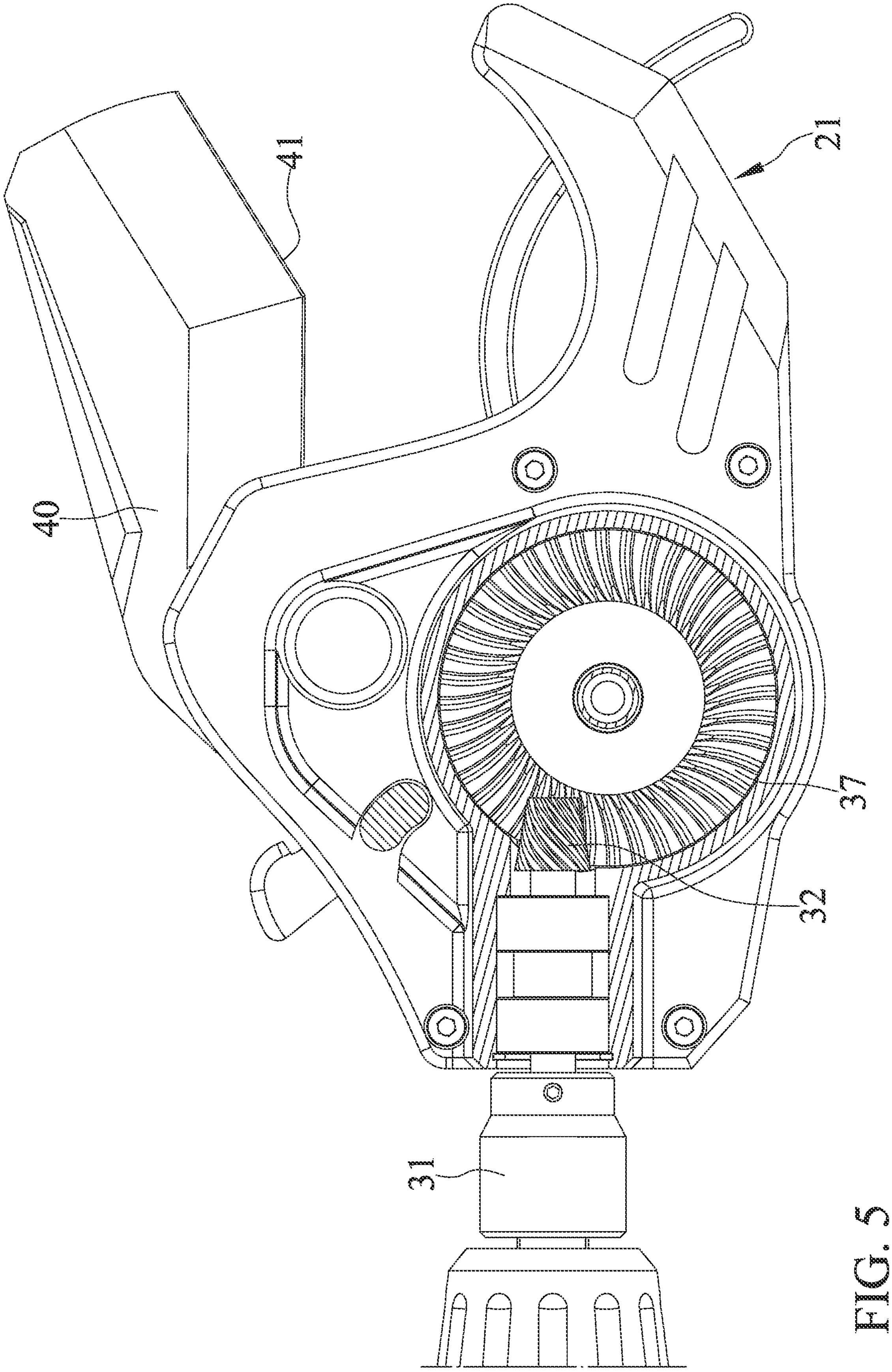
FIG. 5 is a cross-sectional view of the cutter of FIG. 1.
Figure 6:
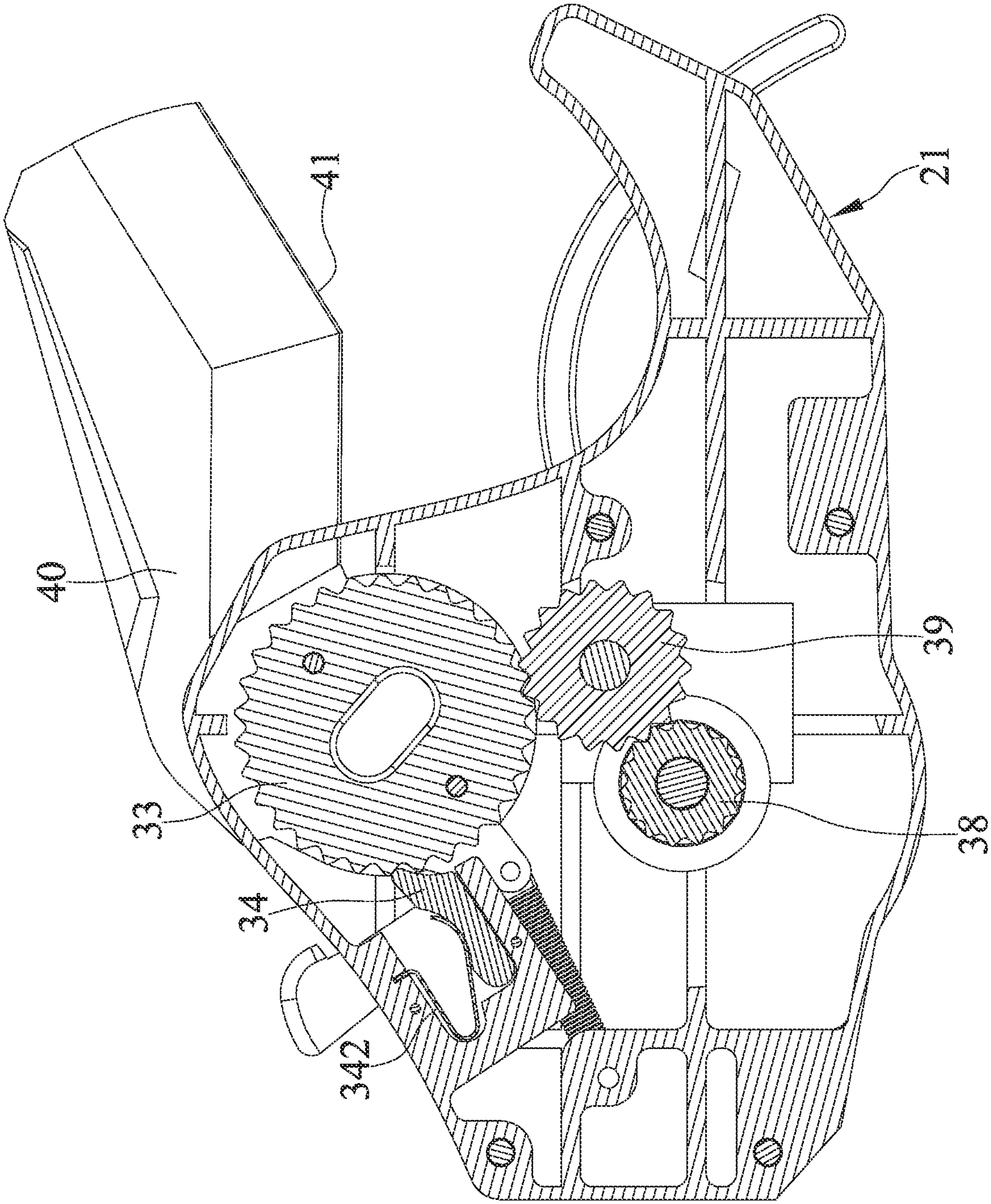
FIG. 6 is another cross-sectional view of the cutter of FIG. 1 and in which a second cog of the cutter in a radial direction thereof is shown.
Figure 7:
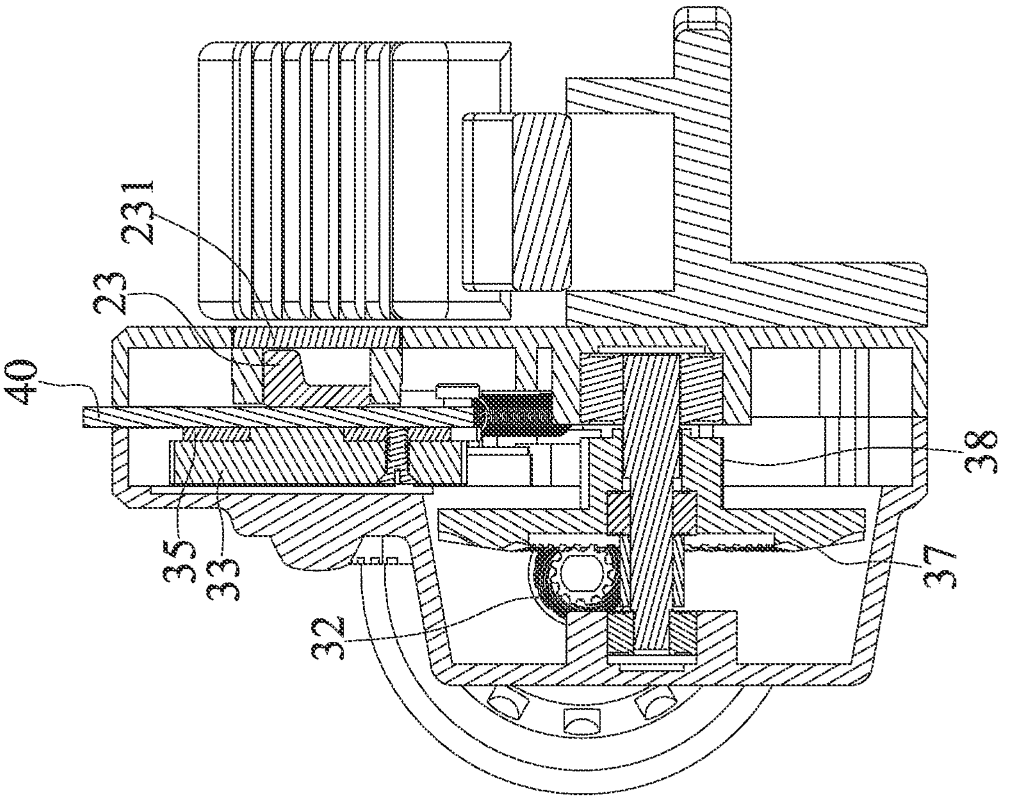
FIG. 7 is yet another cross-sectional structural view of the cutter of FIG. 1 and in which a first cog of the cutter in an axial direction thereof is shown.
Figure 8:
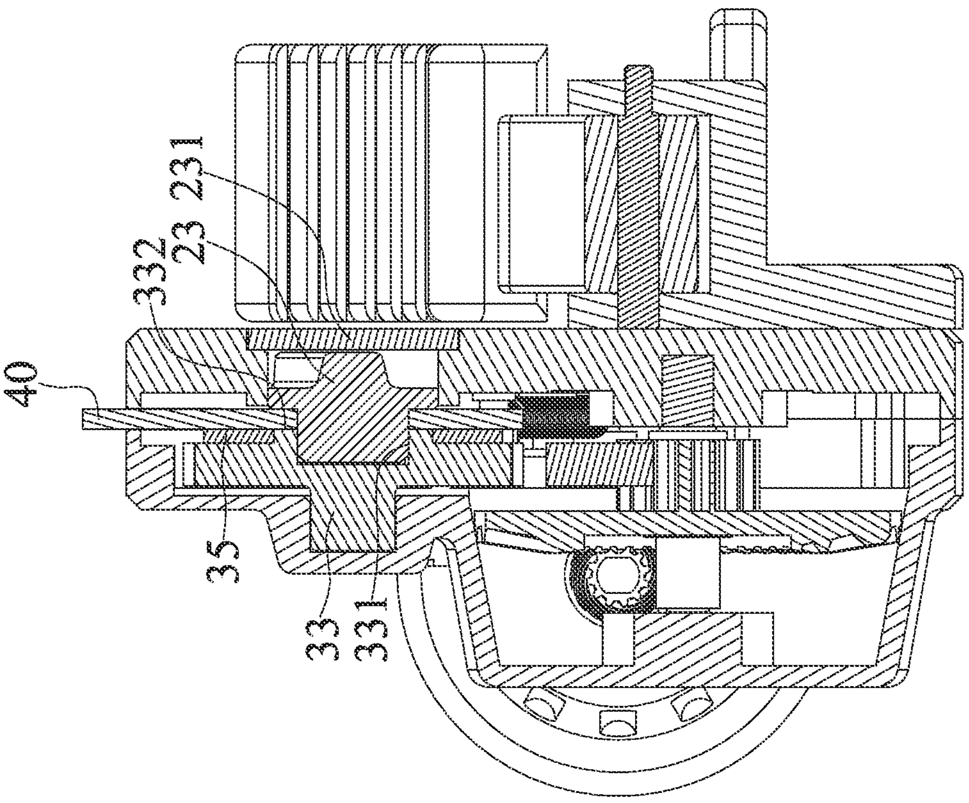
FIG. 8 is yet another cross-sectional view of the cutter of FIG. 1 and in which the second cog of the cutter in an axial direction thereof is shown.
Figure 9:
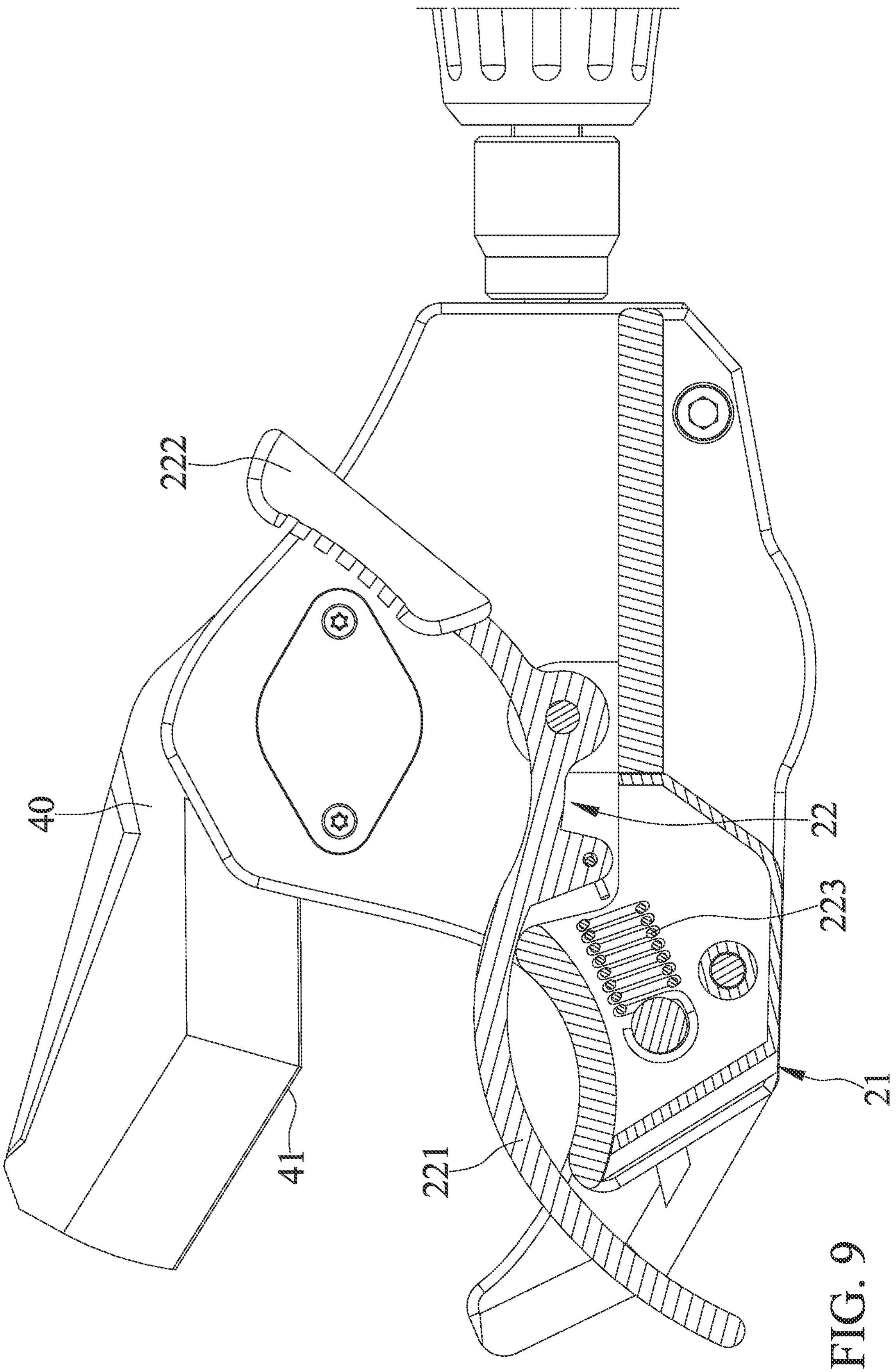
FIG. 9 is yet another cross-sectional view of the clamping device of the cutter of FIG. 1.
Figure 10:
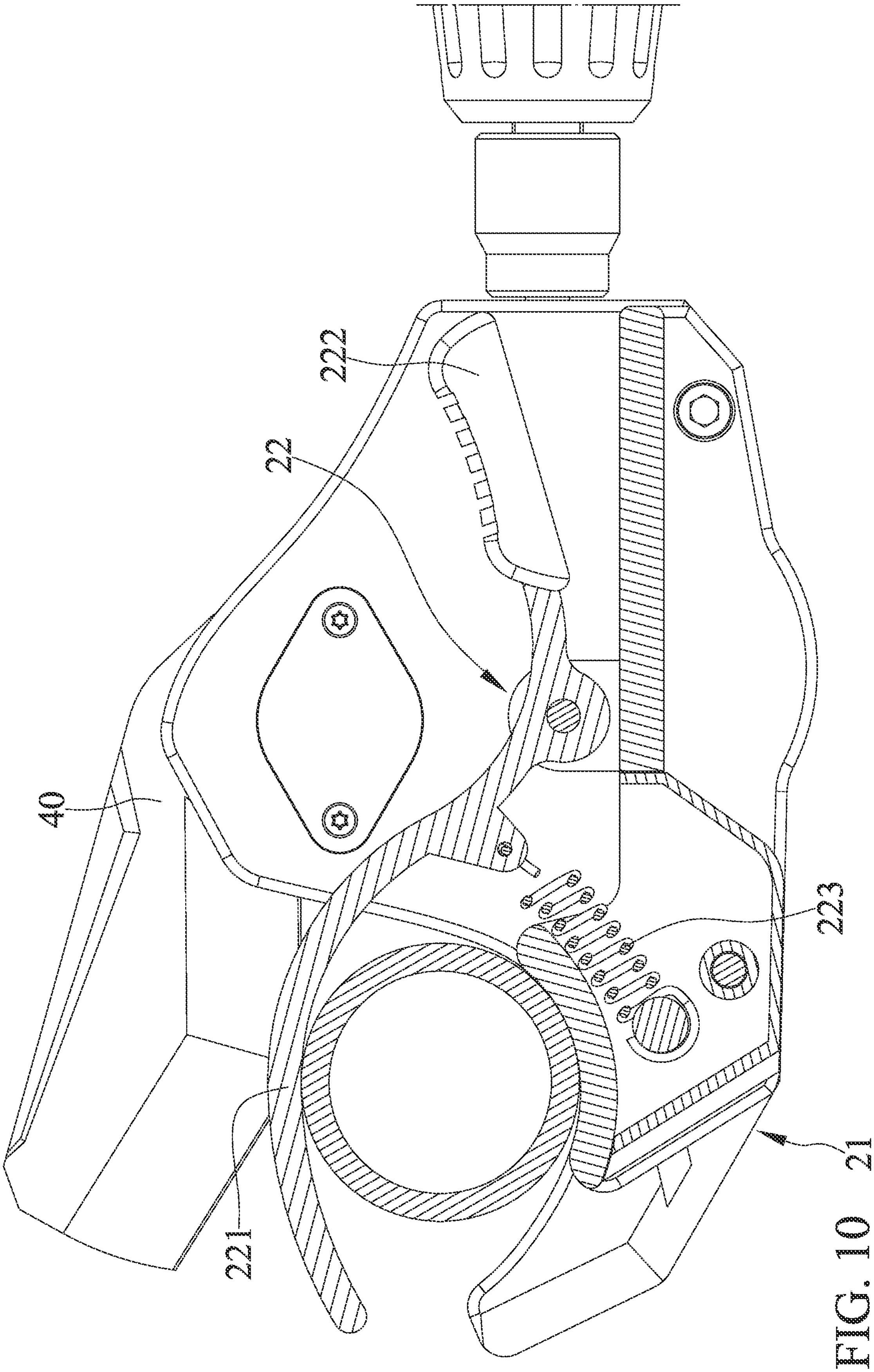
FIG. 10 is yet another cross-sectional view of the cutter of FIG. 1 and illustrates the clamping device holding a pipe.
Figure 11:
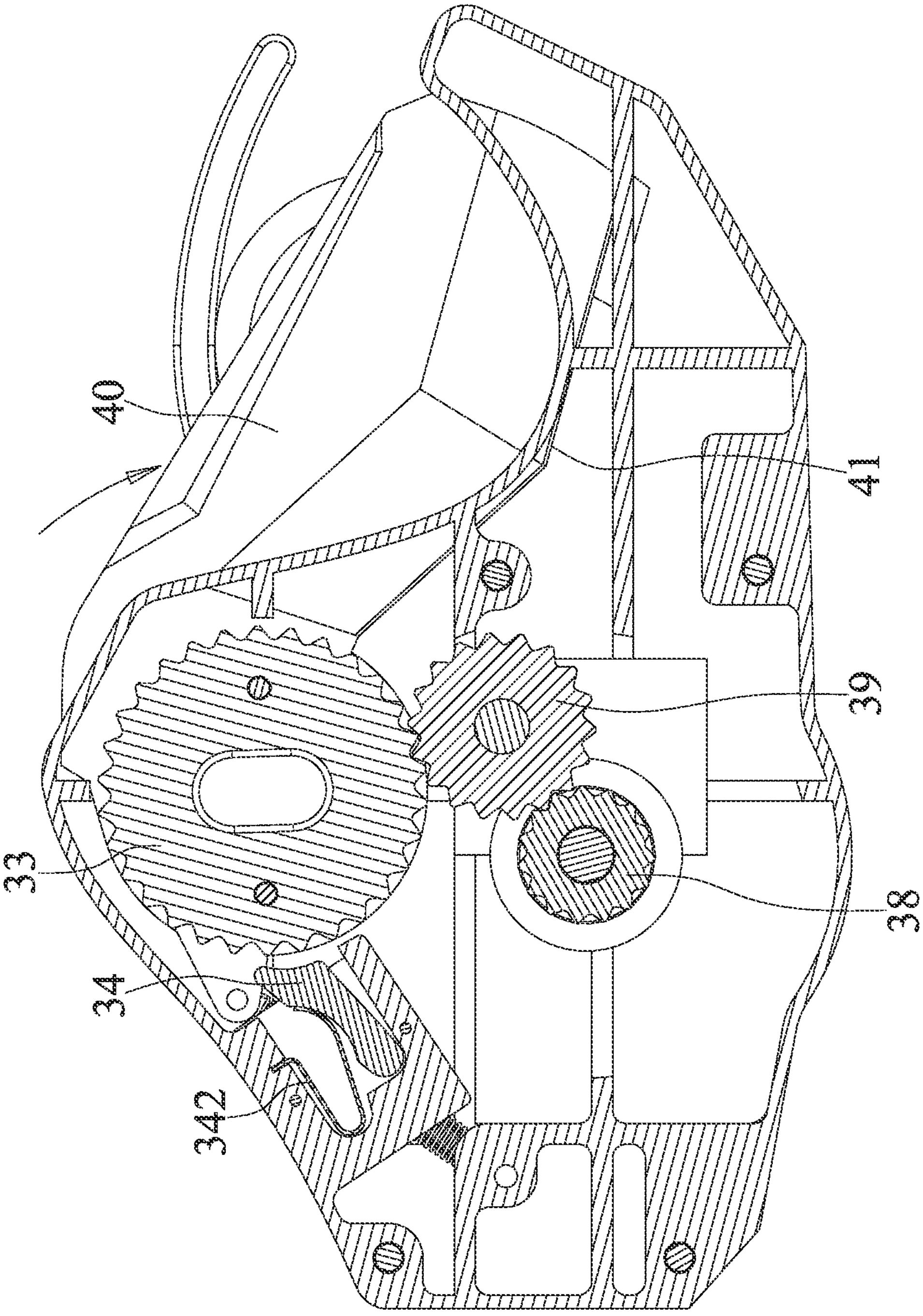
FIG. 11 is yet another cross-sectional view of the cutter of FIG. 1 and illustrates a blade of the cutter in a cutting position.

FIGS. 1 through 11 show a cutter 10 adapted for use with a power tool 90 in accordance with the present invention includes a housing assembly 20, a cog assembly 30, and a blade 40. The cog assembly 30 is arranged on the housing assembly 20. The blade 40 is connected to and operably moved by the cog assembly 30.

The housing assembly 20 includes an anvil 21.

The cog assembly 30 includes a drive shaft 31 and a first and a second cog 32 and 33. The drive shaft 31 is rotatably connected to the housing assembly 20. The drive shaft 31 has a first end configured to detachably connect with the power tool 90. The first cog 32 is disposed on the drive shaft 31 and moves synchronously with the drive shaft 31. The second cog 33 is rotatably connected to the housing assembly 20 and rotates upon rotation of the first cog 32.

The blade 40 is rotatably connected to the housing assembly 20 and connected to the second cog 33 in a manner that rotates synchronously with the second cog 33. The blade 40 has a cutting edge 41 selectively cutting the object to be cut by the cutter 10. The cutting edge 41 includes a first length and a second length extending obliquely to the first length. Therefore, the object can be cut along a straight line or an oblique line. The blade 40 is rotatable between a deployment position and a cutting position with respect to the object. The cutting edge 41 is disposed away from the anvil 21 when the blade 40 is in the deployment position, but is adjacent to the anvil 21 when the blade 40 is in the cutting position.

The cutter 10 also includes a rotatable shaft 23 rotatably and detachably connected to the housing assembly 20. The second cog 33 and the blade 40 are connected to the rotatable shaft 23 such that when the rotatable shaft 23 rotates, the second cog 33 and the blade 40 rotate synchronously with and about the rotatable shaft 23. The second cog 33 has a first hole 331 configured for receiving the rotatable shaft 23. The blade 40 has a perforation 42 configured for receiving the rotatable shaft 23. When the rotatable shaft 23 is connected to the housing assembly 20 and inserted into the first hole 331 and the perforation 42, the second cog 33 and the blade 40 rotate synchronously with the rotatable shaft 23 in response to rotation of the rotatable shaft 23. When the rotatable shaft 23 is disconnected from the housing assembly 20, the blade 40 is adapted to be disconnected from the rotatable shaft 23 and removed in a radial direction from the housing assembly 20.

The cog assembly 30 also includes a pawl 34 selectively engaged with and disengaged from the second cog 33. The pawl 34 is rotatably connected to the housing assembly 20 and being rotatable between an engaged position and a disengaged position with respect to the second cog 33. When the pawl 34 is in the engaged position, the second cog 33 is rotatable in a first direction and unrotatable in a second direction opposite the first direction such that the blade 40 is limited to be rotatable from the deployment position to the cutting position. When the pawl 34 is in the disengaged position, the second cog 33 is rotatable in the first and the second directions. The pawl 34 is operably connected to a switch 341. The switch 341 is movably connected to and protrudes out of the housing assembly 20. The cog assembly 30 includes a first spring 342 configured to bias the pawl 34 between the engaged position and the disengaged position with respect to the second cog 33. The first spring 342 has a first end supported on the pawl 34 and a second end supported on the housing assembly 20.

The cog assembly 30 further includes a reset mechanism configured to provide a driving force to cause the blade 40 to move to the deployment position. The reset mechanism includes a reset member 35 and a spring 36 configured to bias the reset member 35. The reset member 35 is connected to the second cog 33 in a manner that rotates synchronously with the second cog 33. In the embodiment, the second cog 33 has a flange 332 protruding on a side thereof in a direction along an axial direction of the rotatable shaft 23 and surrounding the first hole 331, the reset member 35 has a second hole 351 configured for receiving the flange 332, and the flange 332 is inserted into the second hole 351 for allowing the reset member 35 to rotate synchronously with the second cog 33. The reset member 35 is connected between the second cog 33 and the blade 40. The spring 36 has a first end supported on the reset member 35 and a second end supported on the housing assembly 20. The spring 36 is adapted to provide a resilient pulling force to cause the blade 40 to move to the deployment position. The reset member 35 is connected to the rotatable shaft 23 such that when the rotatable shaft 23 rotates, the reset member 35 rotates synchronously with and about the rotatable shaft 23. The reset member 35 includes the second hole 351 adapted to receive the rotatable shaft 23.

The cog assembly 30 further includes a first intermediate cog 37, a second intermediate cog 38 and a third intermediate cog 39. The first and the second intermediate cogs 37 and 38 are rotatably connected to the housing assembly 20 in a manner that rotate synchronously about a same axis. The first intermediate cog 37 and the first cog 32 are engaged with each other. The first cog 32 and the first intermediate cog 37 are helical gears. The second cog 33 and the second intermediate cog 38 are interlinked with each other by the third intermediate cog 39 such that the second intermediate cog 38 is not in contact with the second cog 33 and the third intermediate cog 39 is engaged between the second cog 33 and the second intermediate cog 38. The second cog 33, the second intermediate cog 38, and the third intermediate cog 39 are spur gears. The second intermediate cog 38 and the first cog 32 are arranged at opposite sides of the first intermediate cog 37.

The cutter 10 also includes a clamping device 22 configured to selectively clamp and release the object. The clamping device 22 is rotatably connected to the housing assembly 20 and being rotatable between a clamping position and a release position with respect to the object. The clamping device 22 is adjacent to the blade 40. The clamping device 22 is rotatable about a rotation axis and has a holding portion 221 at a first end and an operating portion 222 at a second end. The holding portion 221 is disposed adjacent to the anvil 21 when the clamping device 22 is in the clamping position, but is away from the anvil 21 when the clamping device 22 is in the release position. The clamping device 22 is attached to a resilient member 223. The resilient member 223 applies a force opposite to a force causing rotation of the clamping device 22. The resilient member 223 has a first end connected to the clamping device 22 and a second end connected to the anvil 21.

The cutter 10 further includes a cover 231 detachably connected to the housing assembly 20 and adapted to prevent detachment of the rotatable shaft 23 from the housing assembly 20. When the cover 231 is connected to the housing assembly 20, it abuts the rotatable shaft 23 and disposed opposite to the second cog 33. When the over 231 is disconnected from the housing assembly 20, the rotatable shaft 23 is adapted to be detached from the housing assembly 20.

In view of the foregoing, the cutter 10 with set forth design can connect to the power tool 90 and power tool 90 can drive the cutter 10 to cut an object, so that a user can perform a cutting operation in a labor-saving and stable-output manner. Also, the clamping device 22 can clamp the object before shearing and therefore, it is convenient for the user to align the blade 40 with the position to be cut.

The foregoing is merely illustrative of the principles of this invention and various modifications can be made by those skilled in the art without departing from the scope and spirit of the invention.

What is claimed is:

1. A cutter adapted for use with a power tool comprising:

a housing assembly including an anvil;

a cog assembly including a drive shaft and a first and a second cog, a first intermediate cog, a second intermediate cog and a third intermediate cog, wherein the drive shaft is rotatably connected to the housing assembly, wherein the drive shaft has a first end configured to detachably connect with the power tool, wherein the first cog is disposed on the drive shaft and moves synchronously with the drive shaft, wherein the second cog is rotatably connected to the housing assembly and rotates upon rotation of the first cog, wherein the first and the second intermediate cogs are rotatably connected to the housing assembly in a manner that allows them to rotate synchronously about a same axis, wherein the first intermediate cog and the first cog are engaged with each other, wherein the second cog and the second intermediate cog are interlinked with each other by the third intermediate cog such that the second intermediate cog is not in contact with the second cog and the third intermediate cog is engaged between the second cog and the second intermediate cog, wherein the second cog, the second intermediate cog, and the third intermediate cog are configured to provide a mechanical advantage between the drive shaft and the second cog, and wherein the second intermediate cog and the first cog are arranged at opposite sides of the first intermediate cog; and a blade connected to the cog assembly, wherein the blade is rotatably connected to the housing assembly and connected to the second cog in a manner that rotates synchronously with the second cog, wherein the blade has a cutting edge selectively cutting the object to be cut by the cutter, wherein the blade is rotatable between a deployment position and a cutting position with respect to the object, and wherein the cutting edge is disposed away from the anvil when the blade is in the deployment position, but is adjacent to the anvil when the blade is in the cutting position.

2. The cutter as claimed in claim 1 further comprising a clamping device configured to selectively clamp and release the object, wherein the clamping device is rotatably connected to the housing assembly and being rotatable between a clamping position and a release position with respect to the object, wherein the clamping device is adjacent to the blade, wherein the clamping device is rotatable about a rotation axis and has a holding portion at a first end and an operating portion at a second end, and wherein the holding portion is disposed adjacent to the anvil when the clamping device is in the clamping position, but is away from the anvil when the clamping device is in the release position.

3. The cutter as claimed in claim 2, wherein the clamping device is attached to a resilient member, wherein the resilient member applies a force opposite to a force causing rotation of the clamping device, and wherein the resilient member has a first end connected to the clamping device and a second end connected to the anvil.

4. The cutter as claimed in claim 1, wherein the cog assembly includes a pawl selectively engaged with and disengaged from the second cog, wherein the pawl is rotatably connected to the housing assembly and being rotatable between an engaged position and a disengaged position with respect to the second cog, wherein when the pawl is in the engaged position, the second cog is rotatable in a first direction and unrotatable in a second direction opposite the first direction such that the blade is limited to be rotatable from the deployment position to the cutting position, wherein when the pawl is in the disengaged position, the second cog is rotatable in the first and the second directions, and wherein the pawl is operably connected to a switch, and wherein the switch is movably connected to and protrudes out of the housing assembly.

5. The cutter as claimed in claim 4, wherein the cog assembly includes a first spring configured to bias the pawl between the engaged position and the disengaged position with respect to the second cog, and wherein the first spring has a first end supported on the pawl and a second end supported on the housing assembly.

6. The cutter as claimed in claim 1 further comprising a second rotatable shaft rotatably and detachably connected to the housing assembly, wherein the second cog and the blade are connected to the second rotatable shaft such that when the second rotatable shaft rotates, the second cog and the blade rotate synchronously with and about the second rotatable shaft, wherein the second cog has a first hole configured for receiving the second rotatable shaft, wherein the blade has a perforation configured for receiving the second rotatable shaft, wherein when the second rotatable shaft is connected to the housing assembly and inserted into the first hole and the perforation, the second cog and the blade rotate synchronously with the second rotatable shaft in response to rotation of the second rotatable shaft, and wherein when the second rotatable shaft is disconnected from the housing assembly, the blade is adapted to be disconnected from the second rotatable shaft and removed in a radial direction from the housing assembly.

7. The cutter as claimed in claim 6 further comprising a cover detachably connected to the housing assembly and adapted to prevent detachment of the second rotatable shaft from the housing assembly, wherein when the cover is connected to the housing assembly, it abuts the second rotatable shaft and disposed opposite to the second cog, and wherein when the cover is disconnected from the housing assembly, the second rotatable shaft is adapted to be detached from the housing assembly.

8. The cutter as claimed in claim 6, wherein the cog assembly includes a reset mechanism configured to provide a driving force to cause the blade to move to the deployment position, wherein the reset mechanism includes a reset member and a spring configured to bias the reset member, wherein the reset member is connected to the second cog in a manner that rotates synchronously with the second cog, wherein the second cog has a flange protruding on a side thereof in a direction along an axial direction of the second rotatable shaft and surrounding the first hole, wherein the reset member has a second hole configured for receiving the flange, wherein the flange is inserted into the second hole for allowing the reset member to rotate synchronously with the second cog, wherein the reset member is connected between the second cog and the blade, wherein the spring has a first end supported on the reset member and a second end supported on the housing assembly, and wherein the spring is adapted to provide a resilient pulling force to cause the blade to move to the deployment position.

9. The cutter as claimed in claim 1, wherein the first cog and the first intermediate cog are helical gears, wherein the second cog, the second intermediate cog, and the third intermediate cog are spur gears.

10. The cutter as claimed in claim 1, wherein the cutting edge includes a first length and a second length extending obliquely to the first length.

11. The cutter as claimed in claim 2, wherein the cog assembly includes a pawl selectively engaged with and disengaged from the second cog, wherein the pawl is rotatably connected to the housing assembly and being rotatable between an engaged position and a disengaged position with respect to the second cog, wherein when the pawl is in the engaged position, the second cog is rotatable in a first direction and unrotatable in a second direction opposite the first direction such that the blade is limited to be rotatable from the deployment position to the cutting position, wherein when the pawl is in the disengaged position, the second cog is rotatable in the first and the second directions, and wherein the pawl is operably connected to a switch, and wherein the switch is movably connected to and protrudes out of the housing assembly.

12. The cutter as claimed in claim 11 further comprising a second rotatable shaft rotatably and detachably connected to the housing assembly, wherein the second cog and the blade are connected to the second rotatable shaft such that when the second rotatable shaft rotates, the second cog and the blade rotate synchronously with and about the second rotatable shaft, wherein the second cog has a first hole configured for receiving the second rotatable shaft, wherein the blade has a perforation configured for receiving the second rotatable shaft, wherein when the second rotatable shaft is connected to the housing assembly and inserted into the first hole and the perforation, the second cog and the blade rotate synchronously with the second rotatable shaft in response to rotation of the second rotatable shaft, and wherein when the second rotatable shaft is disconnected from the housing assembly, the blade is adapted to be disconnected from the second rotatable shaft and removed in a radial direction from the housing assembly.

13. The cutter as claimed in claim 12, wherein the cog assembly includes a reset mechanism configured to provide a driving force to cause the blade to move to the deployment position, wherein the reset mechanism includes a reset member and a spring configured to bias the reset member, wherein the reset member is connected to the second cog in a manner that rotates synchronously with the second cog, wherein the second cog has a flange protruding on a side thereof in a direction along an axial direction of the second rotatable shaft and surrounding the first hole, wherein the reset member has a second hole configured for receiving the flange, wherein the flange is inserted into the second hole for allowing the reset member to rotate synchronously with the second cog, wherein the reset member is connected between the second cog and the blade, wherein the spring has a first end supported on the reset member and a second end supported on the housing assembly, and wherein the spring is adapted to provide a resilient pulling force to cause the blade to move to the deployment position.

14. The cutter as claimed in claim 13, wherein the first cog and the first intermediate cog are helical gears, wherein the second cog, the second intermediate cog, and the third intermediate cog are spur gears.

* * * * *